July 25, 1933.   W. A. MARRISON   1,919,795
SUBHARMONIC FREQUENCY PRODUCER
Original Filed May 11, 1928
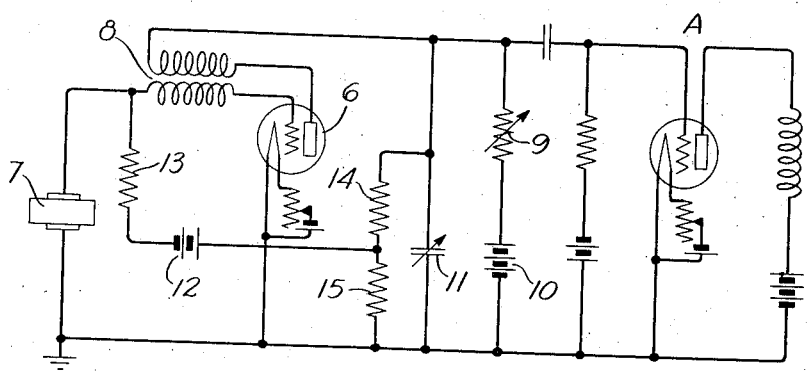
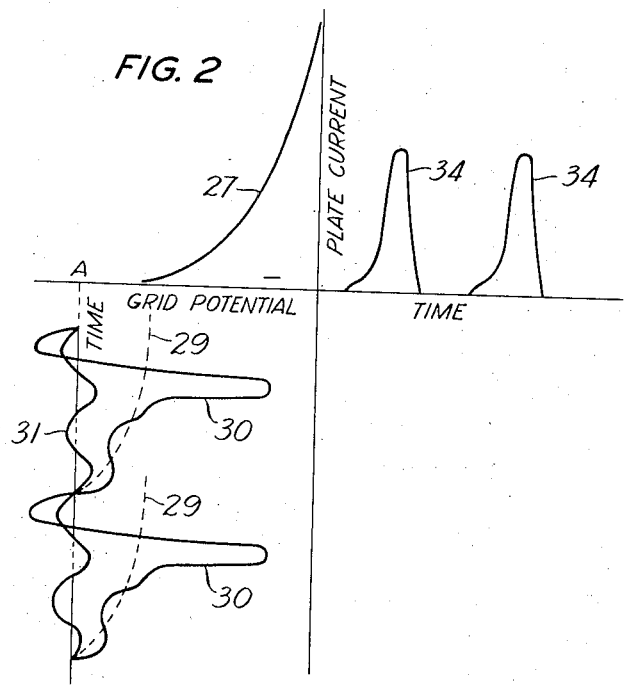
INVENTOR
*W. A. MARRISON*
BY *Guy T. Morris*
ATTORNEY Patented July 25, 1933

1,919,795

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

SUBHARMONIC FREQUENCY PRODUCER

Original application filed May 11, 1928, Serial No. 277,018. Divided and this application filed July 31, 1929. Serial No. 382,306.

This invention relates to sub-harmonic frequency producers or frequency dividers and has for an object to increase the stability of operation of such apparatus. This application is a division of application, Serial No. 277,018, filed May 11, 1928.

For many purposes, it is desirable to produce a wave the frequency of which is a known fraction of the frequency of a given wave. One of the most satisfactory types of standard frequency generators is a piezoelectric controlled oscillator, but this can only be operated at comparatively high frequencies. When a standard low frequency is desired, it is necessary either to use a more or less variable frequency source provided with means to stabilize its operation or to employ a standard high frequency generator associated with some system for stepping down the frequency of the wave produced thereby.

In U. S. patent to applicant 1,733,614, granted October 29, 1929, there is described a system including an electric discharge device for producing a sub-harmonic of a high frequency wave impressed upon the input circuit of the discharge device. The plate circuit of the discharge device includes a condenser arranged to be charged through a resistance, which determines the rate at which the condenser is charged. The grid is negatively biased with respect to the filament so that normally no plate current will flow and this bias is opposed by a positive grid potential proportional to the charging current supplied to the condenser. As a charge accumulates on the condenser a point is reached where this charge plus a positive peak of the applied high frequency wave overcomes the negative grid bias and the space current path becomes conductive, thus permitting the condenser to discharge through the plate circuit, which includes a feed back connection to the grid circuit. As the flow of current from the feed back path increases, the grid is made more positive with respect to the filament, the plate current rises to a maximum value, and the condenser charge is rapidly dissipated. The grid then remains negative with respect to the filament until the condenser charge builds up sufficiently for its charge, plus another positive peak of the applied high frequency wave, to start another discharge. By properly selecting the capacity of the condenser and adjusting the negative potential applied to the grid, it is possible to cause the condenser to discharge once for any given number of cycles of the applied high frequency wave, and thereby to produce an output wave, the frequency of which is a desired sub-multiple of the frequency of the applied high frequency wave. Such a circuit is very stable and operates to produce an output wave the frequency of which may be controlled to have an exact ratio with respect to the input wave without using a highly critical adjustment of the constants of the circuit elements.

In accordance with the present invention, the same principle is utilized, but instead of using a separate source to apply a high frequency potential to the grid of the discharge device, its input and output circuits are coupled in feed back relation to generate oscillations and a piezo-electric crystal, preferably of quartz, is included in the grid circuit.

When the system is operating and the charge on the condenser plus a positive peak of a wave of the crystal frequency causes the condenser to discharge, there is fed back to the input circuit an impulse including a component of the crystal frequency, which shock excites the crystal and maintains it oscillating.

As in the system of the above mentioned application, by properly selecting the value of the condenser and adjusting the negative potential applied to the grid, it is possible to cause the condenser to discharge once for any given number of cycles of the crystal frequency. There is thereby produced an output wave having a frequency which is a desired sub-multiple of the crystal frequency.

In the drawing, Fig. 1 is a circuit diagram of the invention; and,

Fig. 2 shows curves illustrating graphically the operation of the circuit.

Referring to Fig. 1 there is shown a three electrode discharge device 6 which has a piezo-electric crystal 7 in its grid filament circuit. In the space current circuit of the device 6 is the primary of a feed back transformer 8, the secondary of which is in the grid filament circuit thereof, and in series with said primary in the space current circuit is the variable resistance 9 and battery 10.

A variable condenser 11 is connected in parallel with said battery 10 and resistance 9, across the plate and filament of said discharge device.

A battery 12 is connected in the grid circuit in series with a resistance 13 to render the grid normally so negative with respect to the cathode that space current does not flow through the device 6.

The positive terminal of the battery 12 is connected to the junction of two high resistance elements 14 and 15 which are connected in series across the condenser 11. These resistances constitute a potentiometer which applies to the grid of the device a positive potential opposed to the potential of the battery 12, and which is proportional to the charge upon the condenser 11. This apparatus constitutes a sub-harmonic oscillator to which is coupled by resistance the amplifier A.

The operation of the circuit can best be described by reference to the curves of Fig. 2.

For the purpose of this description, it is assumed that the crystal is vibrating at its natural frequency.

Curve 27 is a portion of the grid voltage-plate current characteristic of the device 6 of Fig. 1. The potential applied to the grid from the battery 12 is of such a negative value that the grid normally operates at the point A, about which the potential is varied by the voltage wave due to the vibrations of the piezo-electric device 7, as indicated by the curve 31.

As the charge on the condenser 11 builds up, the grid potential becomes less negative due to the positive potential impressed thereon by the potentiometer 14—15. The effect of this varying potential is represented by curves 29.

The charge on the condenser continues to build up to increase the positive potential applied to the grid by the potentiometer 14—15, until it finally reaches a value such that the negative potential applied by the battery 12 is overcome and space current begins to flow through the tube.

Due to the action of transformer 8 this causes the grid to become more positive, which in turn allows more current to flow, resulting in the discharge of the condenser in a surge of current through the space current path of the character indicated by curves 34. After this occurs the grid again becomes negative with respect to the filament, due to potential applied by the battery 12, which is no longer opposed by the charge on the condenser 11 and the space current ceases to flow through the device 6.

As the charge on the piezo-electric device 7 is proportional to the charge on the grid, the surge of positive potential causes shock excitation of the crystal, which is thereby set into vibration at its natural frequency. Alternate positive and negative charges are thereby produced upon its electrodes and are impressed on the grid of the space discharge tube 6. This potential is represented by curve 31 of Fig. 2.

The combined effect of the charge on the condenser and the voltage developed by crystal oscillations is shown by curve 30 of Fig. 2. As indicated by the nearly horizontal portion of curve 30, the positive potential on the grid is abruptly dissipated, to apply a sharp impulse to shock excite the crystal. The various elements are in the condition originally assumed and the system continues to operate to repeat the cycle described above.

The negative bias will always be overcome and the condenser discharged, causing plate current to flow, at a positive peak of crystal potential, once for a given number of cycles of wave produced by the crystal. The amplifying tube A will, therefore, have impressed upon its input electrodes a wave of a frequency which is a sub-harmonic of the crystal frequency. The value of the sub-harmonic may be made any desired sub-multiple of the crystal frequency, within limits, by selecting suitable values of the condenser 11 and the resistance 9.

It will, of course, be apparent that this invention is capable of various embodiments and applications other than those specifically referred to or described herein. For example, if it is desired to obtain a frequency, say one-sixth of that of the controlling crystal, it is not necessary to do it in one step, but greater stability might be attained by using two steps of one-half and one-third, respectively.

What is claimed is:

1. In combination, a crystal controlled oscillator comprising an anode and a control electrode, and a means comprising a condenser direct current source of potential for charging said condenser and for supplying said anode and a potentiometer in shunt with said condenser, for controlling the production of a wave having a frequency which is a sub-multiple of the crystal frequency, said means also comprising a connection to said potentiometer whereby the steady potential of said control elecrode is a function of the potential of said condenser.

2. In combination, an electric discharge device having input and output circuits, a mechanical vibrating element in said input circuit, a condenser in said output circuit, a direct current source of charging potential for said condenser, means for supplying to said input circuit a direct current potential proportional to the charge on said condenser whereby at a critical potential thereof, said condenser is adapted to discharge through said device, and means whereby the discharge current impulsively excites said vibrating element into vibration.

3. In combination, a three-electrode electric discharge device having an input circuit, an output circuit including a feed back circuit connecting said input and output circuits, a piezo-electric crystal connected in said input circuit, a condenser connected in said output circuit, a source of potential and a resistance connected in series therewith for charging said condenser, and means for applying to the control electrode of said device a direct current potential proportional to the charge on said condenser.

4. In combination, an electric discharge device having input and output circuits, a piezo-electric crystal in said input circuit, a condenser in said output circuit, a direct current source of charging potential for said condenser means including in part said input circuit and responsive to the potential of said condenser for causing said condenser to charge and discharge at a rate which is a sub-multiple of the natural frequency of said crystal, and means whereby the discharge current impulsively excites said piezo-electric crystal into vibration at its characteristic frequency.

5. In combination, an electric discharge device having input and output circuits, a piezo-electric crystal connected in said input circuit, biasing potential means in circuit therewith, a plate current source, a condenser in shunt therewith, a connection from said condenser to said biasing potential means for recurrently varying the biasing potential as in accordance with the variations of potential across said condenser, whereby said biasing means prevents the flow of space current in the output circuit of said device except at intervals corresponding to a definite number of vibrations of said piezo-electric crystal and means whereby the flow of space current actuates said piezo-electric crystal into vibration at its characteristic frequency.

6. A sub-harmonic frequency producer comprising an electric discharge device having a cathode, an anode and a control electrode, an input circuit therefor including a piezo-electric crystal, an output circuit therefor including a condenser and a feed-back connection to said input circuit, a source of potential and a resistance for charging said condenser, a source of potential connected in said input circuit for negatively biasing said grid, and a connection for impressing upon said grid a positive direct current potential proportional to the charge on said condenser.

7. In combination, an electric discharge device having an anode, a cathode and a control electrode, an input circuit therefor including a piezo-electric crystal, an output circuit therefor including a condenser and a feed-back connection to said input circuit, a source of potential and a resistance connected in series for charging said condenser, a source of grid biasing potential connected in said input circuit for normally preventing the flow of space current in said device, and connections for impressing upon said grid a positive direct current potential proportional to the charge on said condenser, whereby said piezo-electric crystal periodically causes said condenser to discharge through the output circuit of said device to control the production of a wave of frequency which is a sub-multiple of the natural frequency of said piezo-electric crystal.

8. The method, using a space discharge device comprising a cathode, an anode and a control electrode, a piezo-electric crystal connected to said cathode and control electrode, and a condenser to produce a wave the frequency of which is a sub-harmonic of the natural frequency of said piezo-electric crystal, which comprises impressing a wave of the frequency of said piezo-electric crystal on the cathode and control electrode of the device, negatively biasing the control electrode of said device so that the anode-cathode path is normally non-conductive, charging the condenser, simultaneously impressing on the control electrode a positive direct current potential proportional to the charge on the condenser, whereby after a given number of cycles of the wave the space current path becomes conductive to discharge said condenser, and sustaining the vibrations of said crystal at its characteristic frequency by the discharge current.

9. In combination, an electric discharge device, a piezo-electric crystal connected thereto, and means for causing said piezo-electric crystal to vibrate at its natural frequency by exciting said piezo-electric crystal at a sub-harmonic of its natural frequency.

10. In combination, a piezo-electric crystal and circuits connected thereto adapted to shock said crystal at a sub-harmonic of its natural frequency, whereby said piezo-electric crystal is caused to vibrate at its natural frequency.

WARREN A. MARRISON.